United States Patent Office 3,359,652
Patented Dec. 26, 1967

3,359,652
PIPELINE NETWORK SIMULATOR
Lionel Ernest Prosser and Carey John Saunders, Harlow, England, assignors to The British Hydromechanics Research Association
Filed June 3, 1965, Ser. No. 461,112
Claims priority, application Great Britain, June 4, 1964, 23,170/64
10 Claims. (Cl. 35—10)

The invention relates to an analogue or model to represent the flow and pressure conditions in an interconnected network of pipes, valves, and other associated components such as in water, gas, or oil distribution or ventilation systems.

Known methods of designing or modifying a pipeline network to meet increased or altered flow and pressure requirements in the most economic manner include the use of electrical digital and analogue computers. However owing to the basic fluid equations connecting flow and pressure being quadratic, whereas electrical current and voltage are normally linearly related, an electrical analogue involves a relatively large number of complex and expensive units to reproduce the corresponding pipes or other components.

The invention has among its objects to provide an analogue for simulating the flow of fluid in interconnected pipes.

According to the invention an analogue for simulating the flow of a fluid, in a network of interconnected pipes comprises a plurality of adjustable orifices, in a layout corresponding to the layout of the network of pipes and other components, the orifices being variable to correspond to the physical data of the pipes, or other components, which they represent, at least one source of fluid supply under pressure or suction and means for measuring pressure at a plurality of positions within the network.

Thus the analogue may comprise a number of pockets, the pockets being provided with a number of connecting positions whereby the junction of two or more pipes may be simulated. Where a pipe or a number of pipes connect between two junction positions, then the pipe or the total of a plurality of pipes may be represented by a sharp edged orifice of a size adjusted to correspond to the length of the pipe or pipes, the cross section of the pipe or pipes and a constant to compensate for the friction factor of the pipe or pipes.

Other variable orifices may be conected between the pockets and one or more manifolds so that the flow through them represent the consumer loads or demands on the system. If air is used as the working fluid in the simulator these valves may conveniently communicate on one side with the atmosphere.

The connecting points of each pocket not used to connect to an orifice may be plugged against flow. Each pocket may be provided with a pressure tapping, and each tapping may advantageously be connected to a mimic board, pressure indicating means being connectable to the mimic board whereby the pressure on any one or more of the pockets may be conveniently measured.

The flow through the whole system may be maintained by one or more sources of liquid or pneumatic pressure or suction from a liquid pump or air compressor or vacuum pump.

The characteristic equation governing the head loss in a pipe through which fluid flows is:

$$H_L = \frac{fL}{2gD}\left(\frac{Q}{A}\right)^2 = \frac{fL}{2gD}\frac{16}{\pi^2}\frac{1}{D^4}Q^2$$

or $$H_L = K_P Q^2$$

where $K_P$ is approximately constant for a given pipe and where:

$H_L$ = head loss along a length of pipe
$f$ = friction factor
$L$ = length of the pipe
$g$ = acceleration due to gravity
$D$ = pipe diameter
$Q$ = flow through the pipe
$A$ = cross sectional area of the pipe The value of $K_P$ may vary slightly with Reynolds number more particularly at lower rates of flow, but in practice in the solution of water distribution networks it is sufficiently accurate to assume a definite value for a given pipe, and to make a minor readjustment if the actual flow rate differs very considerably from the assumed value.

In the case of a water supply distribution network the majority of the cosumers' demands are for definite quantities of water irrespective of the supply pressure. To simulate this condition accurately in an analogue computer involves relatively complicated equipment for each point of consumption. The problem may be considerably alleviated in the proposed invention, however, by increasing the mean pressure difference in the system so that if for example the maximum pressure variation within the network is limited to say 30% of the minimum overall system pressure difference the head across the demand simulators cannot vary by more than 30% and the corresponding flow by about 15%.

A demand simulator may be constructed on similar lines to a pipe simulator described below.

As shown the equation for the head loss in a pipe is:

$$H_L = K_P Q^2$$

The equation for an orifice is:

$$Q = C_d A \sqrt{2gh}$$

or $$h_0 = \frac{Q^2}{C_d^2 A_0^2 2g} = K_0 Q^2$$

where
$C_d$ = discharge coefficient for an orifice
$h_0$ = head drop across orifice
$K_0$ = orifice resistance co-efficient Thus an orifice may be a direct analogue of a pipe, subject to Reynolds number limitations.

In practice it has been found that the variation in pipe constant rarely exceeds 1000:1.

According to the invention furthermore a pipe simulator comprises a gate type valve adapted to present a sharp edged orifice which orifice is of similar shape at every open position of the valve.

Thus the pipe simulator may be formed with a first shim having cut therein an equiangular triangular aperture, a second shim being adapted to close the triangular aperture and drive means being connected to at least one of the shims whereby the size of the triangular aperture may be varied. The drive means may include micrometer means whereby the size of the triangular aperture may be accurately indicated.

Advantageously the gate formed by the shims is provided in a transverse bore in a valve body, which transverse bore connects together two parallel bores in the valve body, the outer ends of the parallel bores being adapted to engage the connecting positions of the pockets.

A variation of opening of the ratio 6:1 provides a variation in $K_P$ of 1296:1 which thus covers the range of pipe sizes likely to be encountered.

The invention is particularly applicable to the analysis and solution of existing or proposed water consumption networks and such an application is illustrated by way of example only in the accompanying drawings in which.

Figure 1:
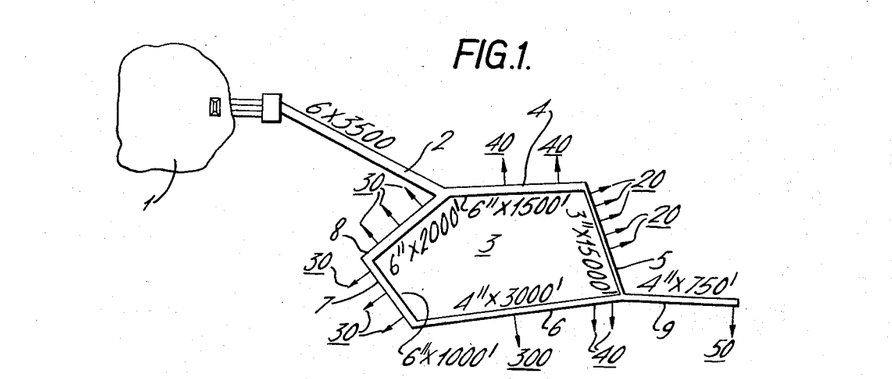
FIGURE 1 shows an exemplary water supply system.

The water system shown in FIGURE 1 comprises a reservoir 1, as a source of supply and feeding a pipe 2. Contour lines decreasing in 50 ft. steps from a 500 ft. line at the reservoir 1 to a 300 ft. line at the right hand side of the network indicate the pressure head. The pipe 2 supplies a closed network 3 formed by pipes 4, 5, 6, 7 and 8 and an extension 9 therefrom, the pipes being of various diameters and lengths. From the pipes at the positions indicated by the arrows, water is consumed at a rate in gallons per hour indicated by the underlined numbers against the arrows. The diameter of each pipe in inches and its length in feet are as indicated.

Figure 2:
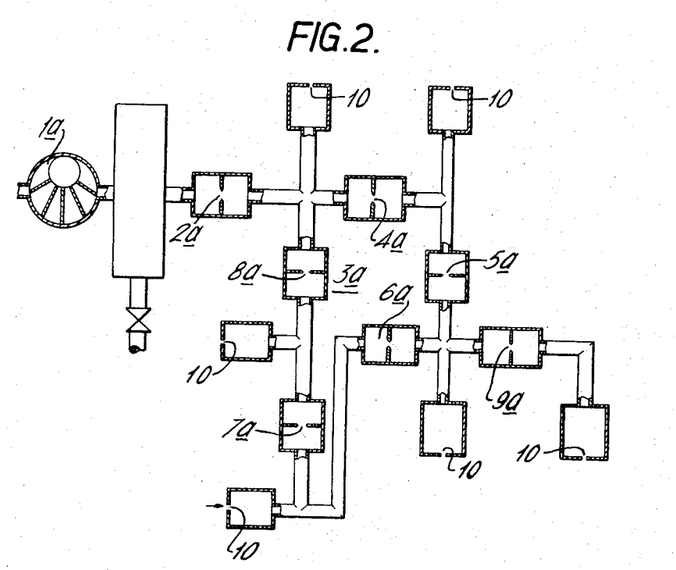
FIGURE 2 shows a simulated circuit, equivalent to the system shown in FIGURE 1.

FIGURE 2 shows a circuit simulating the system of FIGURE 1 in that an exhauster 1a corresponds to the reservoir 1, a sharp edged orifice 2a represents pipe 2 and connects with the network 3a, which network is thereby exhausted by the exhauster 1a. The pipes 4, 5, 6, 7, 8 and 9 of FIGURE 1 are represented in like manner by sharp edged orifices 4a to 9a. The size of each of the orifices 2a and 4a and 9a is set to correspond to the pipe constant of each pipe 2 and 4 to 9 as derived from the equation for $K_P$ above. Each of the consumption demands for water flow of FIGURE 1, or two or more of the consumption demands taken together can be represented by sharp edged orifices 10 open at one side to the atmosphere and of a size corresponding to the amount of consumption demand they represent.

Figure 3:
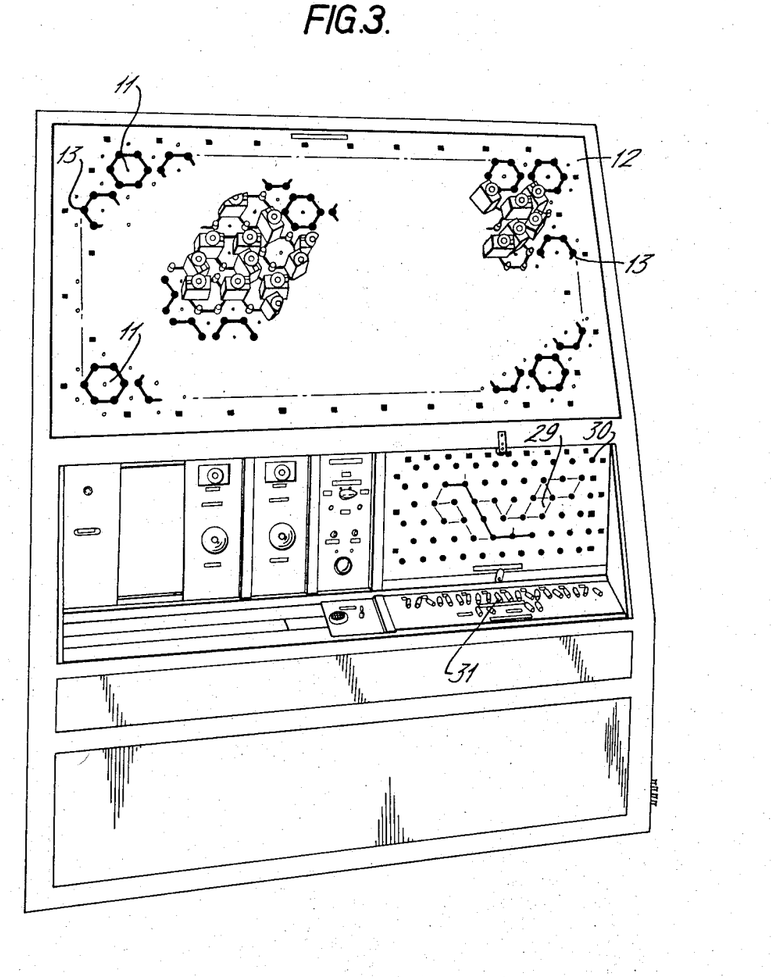
FIGURE 3 is a view of an analogue according to the invention connected to simulate a water circuit.

As shown in FIGURE 3 each junction of two or more of the leads connecting together the orifices 2a and 4a to 9a may be provided by one of a plurality of pockets 11. The pockets are sealed from each other and are provided between two outer sheets on a display board 12. Each of the pockets 11 is provided with six connecting positions 13 formed as rubber lined apertures equally disposed about a pitch circle provided centrally of the pocket 11.

Figure 6:
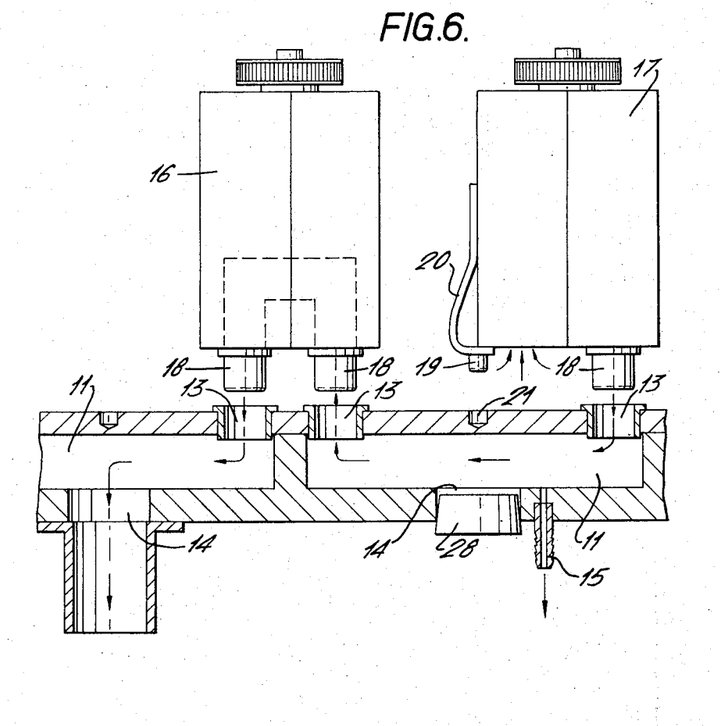
FIGURE 6 is a schematic plan view showing the connection of a pipe simulator to the analogue.
Figure 7:
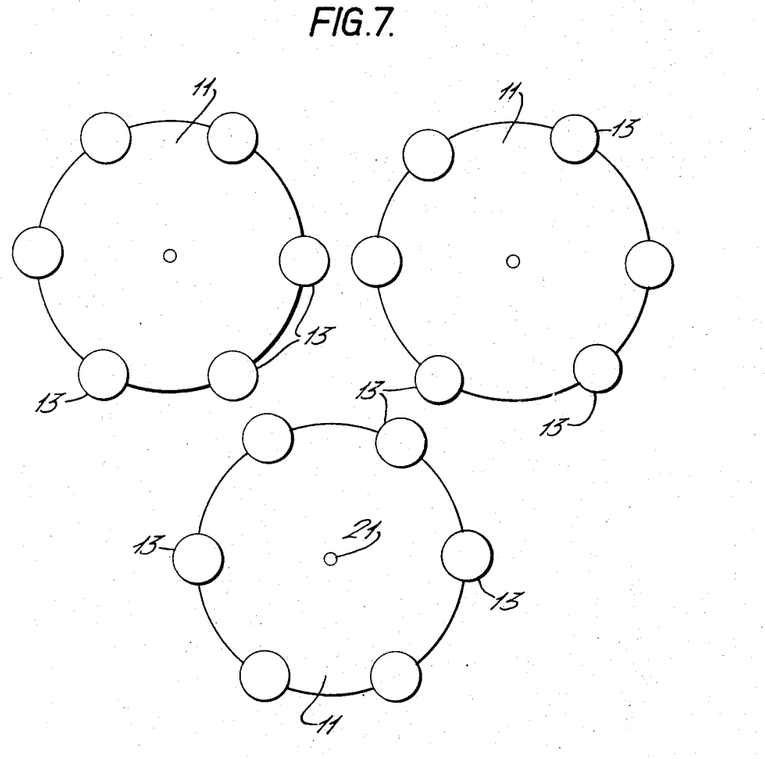
FIGURE 7 shows a relative disposition of the contacts on the analogue.

As shown in FIGURE 6 at the rear of each of the pockets 11 is provided a connecting port 14 and a pressure tapping 15. The disposition of the connecting positions 13 around their pitch circle is more clearly shown in FIGURE 7.

Pipe simulators 16 each representing a sharp edged orifice 2a or 4a to 9a of FIGURE 2 and demand simulators 17 each representing an orifice 10 of FIGURE 2, may be connected between adjacent connecting positions 13 of two pockets 11 by means of projecting tubular members 18 engaging in the rubber lined apertures 13. The demand simulators 17 may be connected between a connecting position 13 and atmosphere by means of a pin 19, on a fitting 20 secured to the simulator, engaging in a boring 21 provided at the centre of the pitch circle of the pocket 11. The construction of the pipe simulator 16 and the demand simulator 17 is shown in greater detail with reference to FIGURES 8 to 11.

Figure 4:
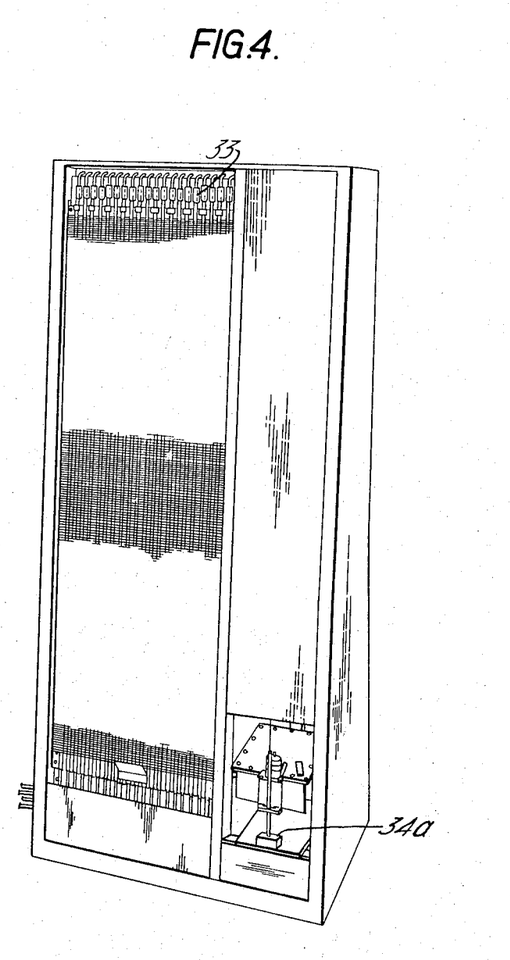
FIGURE 4 is a view of an associated manometer.
Figure 5:
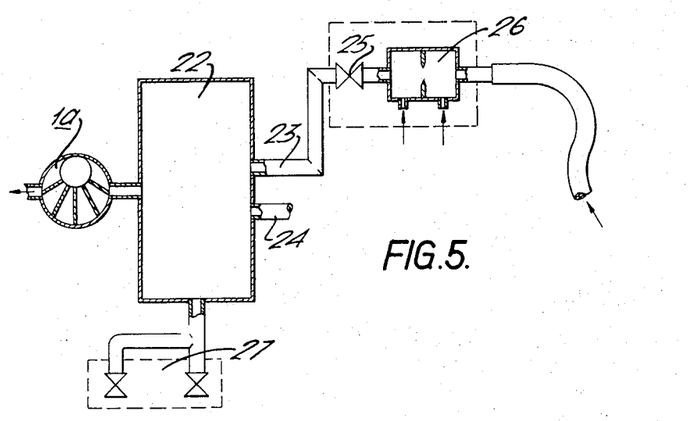
FIGURE 5 is a diagram of the control applied to the simulated supply.

As shown in FIGURE 5 a control of the suction pressure caused by exhauster 1a may be provided by means of a cell 22 provided with connections 23 and 24 whereby connections may be made to networks similar to 3a by means of a control valve 25 and a metering bridge 26, which bridge 26 may be connected to a projection manometer 32 provided on the panel shown in FIGURE 4. A bypass control 27 may be connected to the cell 22 whereby the vacuum therein and hence the vacuum applied to the network may be regulated.

With reference to FIGURES 3 and 4 a plurality of pockets 11 in equally spaced rows for example, six horizontal rows of ten pockets each, may be provided on the display board 12 which may be vertical or inclined to the vertical. The network shown in FIGURE 2 may then be laid out on the display board 12 using the pipe simulators 16 and the demand simulators 17, plug members being used to plug any empty apertures 13 in any pocket 11 which is provided with a pipe simulator 16 or with a demand simulator 17. The connection to the exhauster 1a from the appropriate pocket 11, may be by means of a pipe connected to the connection port 14 at the rear of the cell 11. The connection ports 14 not used for a supply may be plugged by means of bungs 28.

Flexible tubes from each pressure tapping 15 at the rear of the pockets 11 are taken to the rear of a mimic board 29 (FIGURE 3), where they terminate in self sealing pressure connections 30. Onto the connections 30 may be connected as required flexible leads 31, each of which is connected to the upper end of one of a plurality of vertical manometer tubes 33 (FIGURE 4). A coloured water supply to the lower end of each of the manometer tubes is supplied from a height compensating reservoir 34a.

The pressure existing in any of the pockets 11 can thus easily be ascertained by connecting the pocket by means of the tapping 15, the connection 30 and the lead 31 to a manometer tube 33. Each of the manometer tubes 33 is provided at the upper end thereof with two spaced electrical contacts insulated one from the other and projecting into the bore of the manometer tube. If the level of the coloured water or other electrically conductive fluid in the manometer rises to the level of the upper contact then an electrical connection is made between the two contacts whereby a relay is tripped and the power supply to an electrical motor driving the exhauster 1a is cut off. Water is thus prevented from passing into the circuit from the manometer tubes. If the motor does trip out due to the level of fluid in manometers rising above the desired level then the bypass control 27 must be adjusted to increase the bypass and thus lower the amount of vacuum pressure applied to the circuit before the motor is re-energised.

Referring to FIGURES 8 to 12 there is shown the construction of the pipe simulators 16 and the demand simulators 17. The pipe simulators have two tube parts 18 whereas the demand simulators 17 have only one tube part 18 and are provided with the fitting 19/20 shown in FIGURE 6 otherwise the simulators are identical.

The simulators 16/17 are formed of two identical blocks 35 and 36 and a central insert part (FIGURES 11 and 12) formed as an upper member 37 and a lower member 38.

Figure 8:
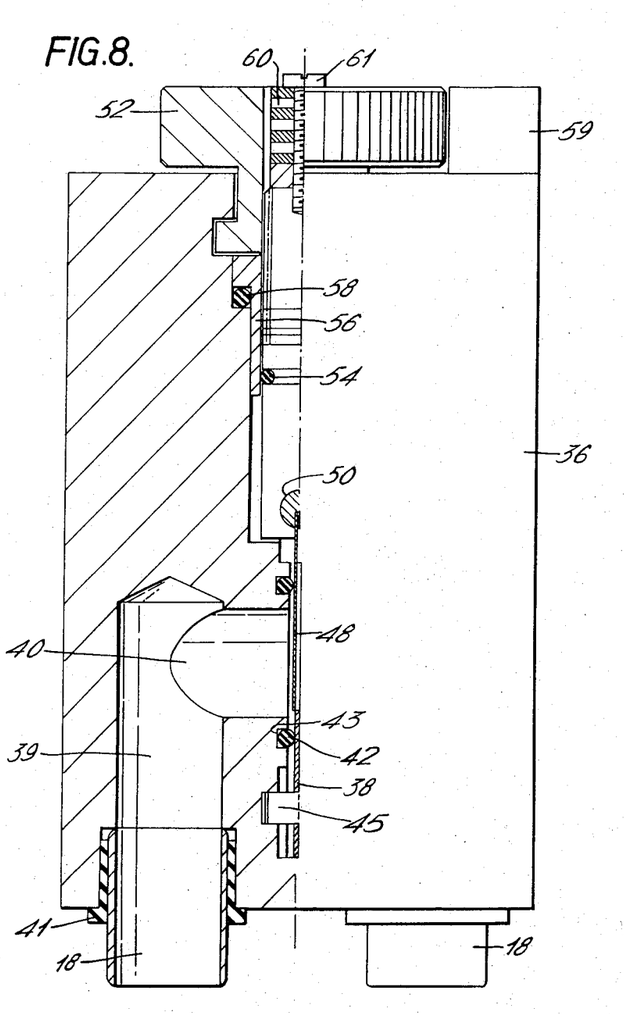
FIGURE 8 is a half sectional elevation of a pipe simulator according to the invention.
Figure 9:
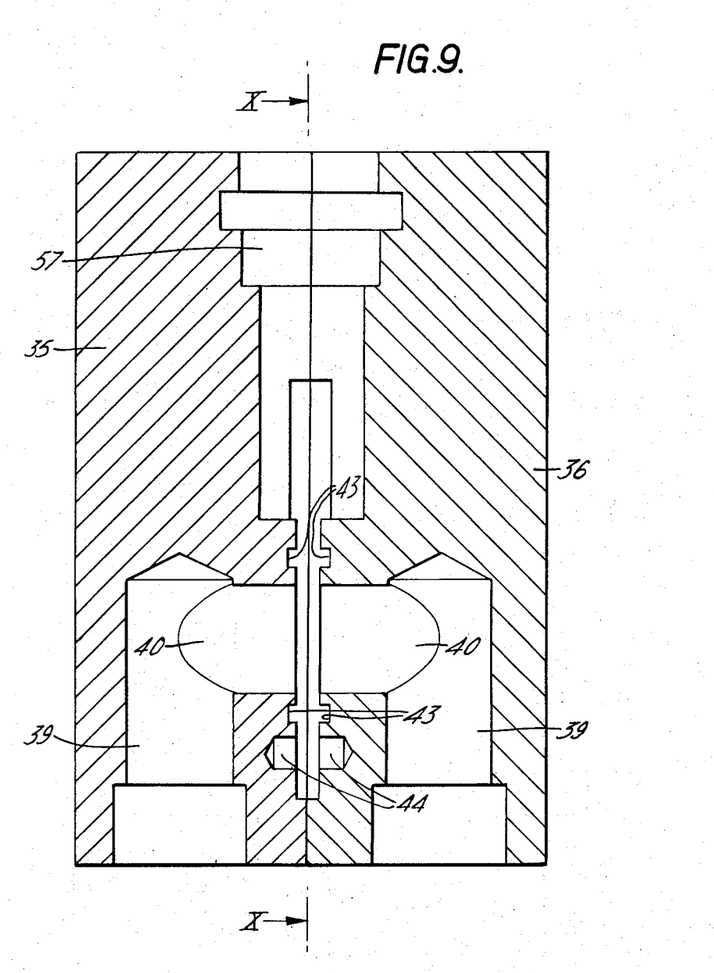
FIGURE 9 is a sectional view similar to FIGURE 8 showing details of the valve body forming the pipe simulator.
Figure 10:
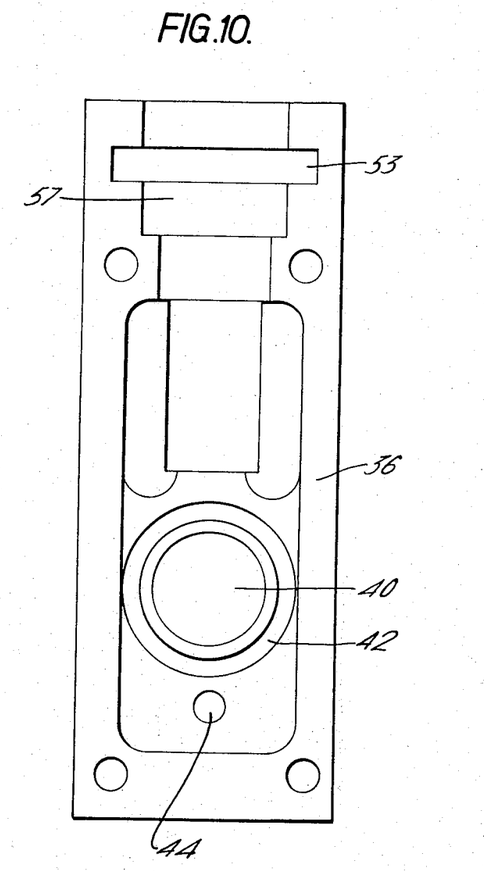
FIGURE 10 is a view on the line X—X of FIGURE 9.

Each of the members 35/36 has a longitudinal bore 39 extending for a portion of the length thereof and a transverse bore 40 connecting with the lateral bore. The connecting tubes 18 are adapted to fit into the enlarged ends of the bores 39 and to be sealed therein by means of annular rubber inserts 41. At the end of the bore 40 remote from the bore 39 is provided a sealing O-ring 42 positioned within an annular groove 43.

Also provided in each of the blocks 35/36 is a bore 44 for a pin 45 which pin passes through a hole 46 in the part 38 and prevents longitudinal movement of the part 38 relative to the blocks 35/36.

Figure 11:
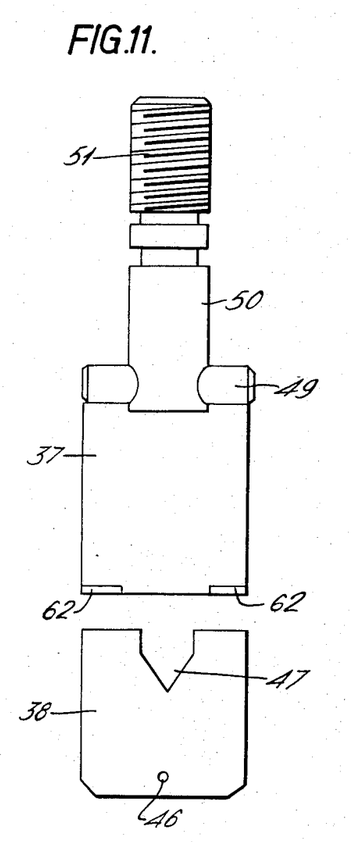
FIGURES 11 and 12 are respectively an exploded view of two parts of the valve gate and a corresponding end view.
Figure 12:
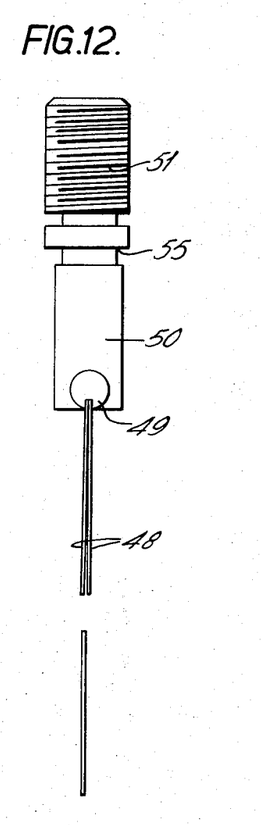

The part 38 has an equi-angle triangular aperture 47 cut therein and the part 38 slots between two shim like members 48 of the part 37 which members 48 are held together by a slotted rod member 49. The rod member 49 is rigidly supported on a stem 50. The outer end 51 of the stem 50 is screw threaded and is adapted to engage with a nut member 52 which nut member is rotatably secured between the blocks 35 and 36, as by means of a groove 53, so as to prevent longitudinal movement of the nut 52 relative to the blocks 35 and 36.

The stem 50 of the part 37 has an O-ring 54 in a groove 55 and the stem 50 is a sliding fit in a collar part 56. The collar part 56 is secured in the blocks 35/36 as by engagement with a groove 57 and is sealed by means of an O-ring 58.

Rotation of the screw member will cause longitudinal movement of the member 37 thus opening or closing the aperture 47 in the member 38. The end of the nut member 52 may be radially divided and marked and a block 59 bearing a reference mark may be provided at the end of the simulators 16/17 so that the angular position of the member 52 may be accurately determined. A striped member 60 may be secured to the end of the screw thread 51 as by a screw 61 or by glueing and be dimensioned so that one stripe emerges from the nut member 52 on each complete rotation of the nut member 52, whereby in conjunction with the radial divisions on the end of the member 52 the size of the aperture 47 set by the nut member 52 may be indicated. The aperture 47 is always positioned within the sealed area defined by the O-rings 42 and the lower edges of the member 37 are chamfered as at 62 whereby a seal between the member 37 and the O-ring 42 may be maintained.

To operate an analogue according to the invention the following data must be obtained from maps and records:

(a) The arrangement of the system.
(b) The diameter, length, and estimated friction factor for each pipe.
(c) The elevation contours of the network.
(d) A representative number of checks of pressure and flow at points in the network, under known loads.
(e) The estimated consumption demands under the conditions to be analysed.

The diameter, length and estimated friction factor for each pipe should then be marked on a large scale line diagram of the network. A pipe constant ($K_P$) value for each pipe is then calculated and these values are put on a map similar to that shown in FIGURE 2. On this map may also be shown height contours, and the pressure measurements obtained in (d) above.

If the problem is one where alterations to an existing system are contemplated, a map showing these alterations presented in a similar fashion to FIGURE 2 should be compiled.

The water system for the sake of the analysis may be simplified as follows without seriously affecting the accuracy of the result obtained.

The smaller branch pipes, for example pipes down cul-de-sacs and very small networks, may be removed from the map, their total consumptions found, and the values placed as single demands at appropriate main junctions.

On convenient lengths of pipe the total demand can be found and its value added to the ends of the pipe in proportion to the demand distribution along its length.

Parallel lengths of pipe between junctions may be substituted for by single lengths of pipe of equivalent resistance.

A scale factor of pipe resistance may be obtained as follows:

The pipe with the smallest resistance is equated to the minimum resistance value setting of the pipe simulators. This will give a scale of pipe resistance $\phi_R$.

The scale of head may then be obtained by taking the greatest expected pressure difference over the actual network and equating it to the greatest available head drop across the simulator. This is purely a function of the design of the system, and is a constant for a given simulator. Thus the scale of head $\phi_H$ is found.

The scale of flow $\phi_Q$ is obtained from the relation:

$$\phi_Q = \sqrt{\frac{\phi_H}{\phi_R}}$$

Using the scale of resistance each pipe simulator 16 is adjusted to its appropriate values and is plugged into the display board 12 to correspond to the simplified pipe diagram of the network to be analyzed as shown in FIGURE 2.

Using the scale of flow the mean head in the simulated network and a calibration chart the load simulators 17 are adjusted to their appropriate values and are plugged into the network.

The supply simulators 1a are then plugged into the network, and the analogue switched on.

Pressures and flows are measured and if necessary adjusted to correspond with the values given in the information supplied that is to say (d) above. Adjustments should be made first to supply, then to demand and finally to pipe simulators, the adjustment to pipe simulators only to be made within the limits of error likely to occur in the original estimation of the resistance of the actual pipes. When the correspondence is complete the simulated network is a true analogue of the actual network.

The engineer operating the analogue can then adjust any of the pipe simulators or supplies to discover what effect a proposed alteration of the system would have or to discover the amount of new pipe laying necessary to satisfy a new demand or an increased demand. The work necessary can thus accurately be estimated and the alterations effected in the most efficient manner.

The simulator is also useful in helping to discover obstructions or major leaks in a system, as the pressure and flows indicated by it will differ from those measured on the actual system.

We claim:
1. An analogue for simulating the flow of fluid in an interconnected network, comprising in combination
    a framework formed to provide a plurality of independent pockets, each pocket constructed to provide a plurality of valve attachment openings suitably disposed to permit interconnection between pockets by analogue elements;
    pipe analogue elements including
        gate valve means providing an adjustable fluid flow restriction for simulating fluid flow characteristics of a pipe being simulated thereby; and
        attachment means disposed for cooperation with said attachment openings to interconnect a pair of said pockets via said associated fluid flow restriction;
    demand analogue elements including
        gate valve means for providing an adjustable fluid flow restriction simulating demand characteristics; and
        attachment means for cooperation with one of said attachment openings to allow controlled pressure leakage relative to the associated pocket via said associated fluid flow restriction;
    a source providing a pressure differential and connectable to at least one of said pockets; and
    means connectable for measuring pressure existing within said pockets.

2. An analogue as claimed in claim 1 in which said fluid flow restrictions in said pipe analogue elements and said demand analogue elements are sharp-edged restrictions.

3. An analogue as claimed in claim 2 in which each of said gate valve means in said pipe analogue elements simulates a pipe in the network, said sharp-edged restrictions being adjustable in size to correspond to a combination of the length of the pipe, the cross section of the pipe and a constant to compensate for the friction factor of the pipe.

4. An analogue as claimed in claim 1 in which the simulated network is a fluid supply system having a supply and at least one demand on the system, said source is a source of vacuum pressure for evacuating said pockets and comprises
   a vacuum air pump representing a supply of fluid pressure for each of said gate valve means of said demand analogue elements allowing a controlled leak of air at atmospheric pressure into said pockets and representing a demand of fluid pressure.

5. An analogue as claimed in claim 1 in which said means for measuring pressure existing within said pockets comprises pressure tappings on each of said pockets with pipes leading therefrom to a mimic board with self-sealing connections provided at the ends thereof on said mimic board and further pipes selectively connectable from said self-sealing connections to pressure indicating means.

6. An analogue for simulating the flow of fluid in an interconnected network, comprising in combination
   a framework formed to provide a plurality of independent pockets,
      each pocket being constructed to provide a plurality of valve attachment openings; and
      the distance between a valve attachment opening of one pocket and the closest valve attachment opening of the adjacent pocket being the same throughout said network;
   plug-in pipe analogue elements including
      means providing a fluid flow restriction for simulating fluid flow characteristics of a pipe being simulated thereby; and
      attachment means disposed for cooperation with said attachment openings for interconnecting an adjacent pair of pockets via said associated fluid flow restriction;
   plug-in demand analogue elements including
      means for providing a fluid flow restriction simulating demand characteristics; and
      attachment means for cooperation with one of said attachment openings to allow controlled pressure leakage relative to the associated pocket via said associated fluid flow restriction;
   a source providing a pressure differential and connectable to at least one of said pockets; and
   means connected for measuring pressure existing within said pockets.

7. An analogue as claimed in claim 6 in which said framework is so formed that said pockets are disposed in banks of rows in a plane surface, six of said valve attachment openings being provided for each pocket, said valve attachment openings being equi-spaced on a pitch circle.

8. An analogue as claimed in claim 6, in which said gate valve means of said pipe and analogue elements each have body parts formed with two spaced-apart parallel borings in connection one with the other by means of a transverse boring, sleeve members secured in said spaced-apart parallel borings being adapted for engagement with said valve attachment openings of said pockets.

9. An analogue as claimed in claim 8, in which said fluid flow restriction in each of said gate valve means of said pipe and demand analogue elements is formed by two shims, a first of said shims being cut away to form an equiangular triangular aperture therein and a second of said shims being adapted to partially close said triangular aperture, drive means being connected to one of said shims whereby the size of the triangular aperture may be varied.

10. An analogue as claimed in claim 9, in which said drive means are formed as interacting screw threads, micrometer means being provided on said screw threads whereby the size of the setting of said triangular aperture may be determined.

References Cited

UNITED STATES PATENTS

| | | | |
|---|---|---|---|
| 1,308,569 | 7/1919 | Wylie | 73—195 |
| 2,564,428 | 8/1951 | Ford | 73—195 |
| 2,903,186 | 9/1959 | Polansky | 235—184 |
| 2,924,894 | 2/1960 | Hellund | 73—432 |

EUGENE R. CAPOZIO, *Primary Examiner.*

W. NIELSEN, *Assistant Examiner.*